United States Patent
Tysowski et al.

(10) Patent No.: US 7,957,357 B2
(45) Date of Patent: Jun. 7, 2011

(54) METHOD AND SYSTEM FOR PRESENTING LISTS OF WIRELESS LOCAL AREA NETWORK PROFILE INFORMATION

(75) Inventors: Piotr Konrad Tysowski, Waterloo (CA); Gary Mousseau, Waterloo (CA); David Yach, Waterloo (CA)

(73) Assignee: Research In Motion Limited, Waterloo (CA)

( * ) Notice: Subject to any disclaimer, the term of this patent is extended or adjusted under 35 U.S.C. 154(b) by 640 days.

(21) Appl. No.: 11/615,215

(22) Filed: Dec. 22, 2006

(65) Prior Publication Data

US 2008/0151842 A1      Jun. 26, 2008

(51) Int. Cl.
*H04W 4/00* (2009.01)
*H04W 24/00* (2009.01)

(52) U.S. Cl. .............. 370/338; 370/328; 455/456.6

(58) Field of Classification Search ............. 455/456.6, 455/456.1
See application file for complete search history.

(56) References Cited

U.S. PATENT DOCUMENTS

| | | | |
|---|---|---|---|
| 5,983,115 A | | 11/1999 | Mizikovsky |
| 7,043,277 B1 * | | 5/2006 | Pfister |
| 7,085,588 B1 * | | 8/2006 | Pfister et al. |
| 7,127,275 B2 * | | 10/2006 | Pfister |
| 2004/0082327 A1 * | | 4/2004 | Kim et al. |
| 2005/0090259 A1 * | | 4/2005 | Jain et al. ..................... 455/439 |
| 2005/0094593 A1 * | | 5/2005 | Buckley ........................ 370/328 |
| 2005/0110953 A1 * | | 5/2005 | Castaldi et al. ................. 353/30 |
| 2005/0147060 A1 * | | 7/2005 | Buckley |
| 2005/0147073 A1 * | | 7/2005 | Hietalahti et al. |
| 2005/0148299 A1 * | | 7/2005 | Buckley ....................... 455/41.2 |
| 2005/0148332 A1 | | 7/2005 | Buckley et al. |
| 2005/0148333 A1 * | | 7/2005 | Buckley |
| 2005/0220137 A1 * | | 10/2005 | Prigent et al. ................. 370/449 |
| 2005/0221844 A1 * | | 10/2005 | Trethewey et al. ........ 455/456.6 |
| 2005/0249171 A1 | | 11/2005 | Buckley et al. |
| 2005/0254469 A1 * | | 11/2005 | Verma et al. .................. 370/338 |
| 2006/0073832 A1 * | | 4/2006 | Pfister |
| 2006/0217131 A1 * | | 9/2006 | Alizadeh-Shabdiz et al. |
| 2006/0221917 A1 * | | 10/2006 | McRae |
| 2006/0234705 A1 * | | 10/2006 | Oommen |

FOREIGN PATENT DOCUMENTS

| | | |
|---|---|---|
| WO | WO 99/40746 | 8/1999 |
| WO | WO 01/62034 | 8/2001 |

* cited by examiner

*Primary Examiner* — Nick Corsaro
*Assistant Examiner* — Joshua Schwartz
(74) *Attorney, Agent, or Firm* — Joseph Conneely; McCarthy Tetrault LLP (57) ABSTRACT

A method for selecting a wireless local area network ("WLAN") for a wireless device, comprising: generating a first list of WLAN identifiers for a first group of one or more wireless local area networks ("WLANs") accessible at a first geographic location and storing the first list in the wireless device; generating a second list of WLAN identifiers for a second group of one or more WLANs accessible at a second geographic location and storing the second list in the wireless device; selecting one of the first and second lists as an active list; and, scanning for WLANs identified by the active list to identify an available WLAN for the wireless device.

22 Claims, 6 Drawing Sheets

METHOD AND SYSTEM FOR PRESENTING LISTS OF WIRELESS LOCAL AREA NETWORK PROFILE INFORMATION

FIELD OF THE APPLICATION

This application relates to the field of wireless communications between wireless and other devices, and more specifically, to a method and system for presenting lists of wireless local area network profile information to users of wireless and other devices.

BACKGROUND

Current wireless mobile communication devices include microprocessors, memory, soundcards, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms. Such wireless devices may operate on a cellular network, on a wireless local area network ("WLAN"), or on both of these types of networks.

With respect to WLANs, the term "Wi-Fi" ("Wireless Fidelity") pertains to certain types of WLANs that use specifications in the Institute of Electrical and Electronics Engineers ("IEEE") 802.11 family. The term Wi-Fi was created by an organization called the Wi-Fi Alliance, which oversees tests that certify product interoperability. The particular specification under which a Wi-Fi network operates is called the "flavour" of the network. Wi-Fi has gained acceptance in many businesses, office buildings, agencies, schools, and homes as an alternative to a wired local area network ("LAN"). All the 802.11 specifications use the Ethernet protocol and Carrier Sense Multiple Access with Collision Avoidance ("CSMA/CA") for path sharing. The original modulation used in 802.11 was phase-shift keying ("PSK"). However, other schemes, such as complementary code keying ("CCK"), are used in some of the newer specifications. The newer modulation methods provide higher data speed and reduced vulnerability to interference. In addition, to improve security, entities running a WLAN often use security safeguards such as encryption or a virtual private network ("VPN").

In a WLAN, an access point ("AP") is a station that transmits and receives data (sometimes referred to as a transceiver). An access point connects users to other users within the network and also can serve as the point of interconnection between the WLAN and a wired LAN. Each access point can serve multiple users within a defined network area. As users move beyond the range of one access point (i.e., when they roam), they are automatically handed over to the next one. A small WLAN may only require a single access point. The number of access points required increases as a function of the number of network users and the physical size of the network.

An 802.11 WLAN may operate in "infrastructure mode" or in "ad-hoc mode". In infrastructure mode, wireless devices communicate with each other by first going through an AP. In this mode, wireless devices can communicate with each other or can communicate with a wired network. The term basic service set ("BSS") is used to refer to a configuration where one AP is connected to a wired LAN and a set of wireless devices. An extended service set ("ESS") an configuration comprising two or more BSSs that form a single sub-network or WLAN. Most corporate WLANs operate in infrastructure mode because they require access to the wired LAN in order to use services such as file servers or printers. In ad-hoc mode, wireless device communicate directly with each other, without the use of an AP. Ad-hoc mode is also referred to as peer-to-peer mode or an independent basic service set ("IBSS") configuration. Ad-hoc mode is useful for establishing a network where wireless infrastructure does not exist or where corporate network services are not required.

A service set identifier ("SSID") is a unique 32-character network name, or identifier, that differentiates one WLAN from another. All APs and wireless devices attempting to connect to a specific WLAN must use the same SSID. The SSID can be any alphanumeric entry up to a maximum of 32 characters and is typically case sensitive. The SSID is attached to the header of packets sent over a WLAN and acts as a password when a wireless device tries to connect to a WLAN (or ESS). As mentioned, the SSID differentiates one WLAN from another, so all APs and all wireless and other devices attempting to connect to a specific WLAN must use the same SSID. A device will not be permitted to join a WLAN (or ESS) unless it can provide the WLAN's unique SSID. A SSID is also referred to as a network name because essentially it is a name that identifies a WLAN. Typically, the APs of a WLAN broadcast their SSIDs to wireless devices within their coverage area.

On a wireless device, each SSID has an associated profile which is a saved group of network settings relating to the WLAN that the SSID identifies. A SSID profile typically includes information such as the following: the SSID or WLAN name; a profile name (i.e., an optional alternate name for the WLAN other than the SSID); the operating mode (e.g., infrastructure, ad hoc, etc.); the standard type (e.g., 802.11a, 802.11b, 802.11g, etc.); and, security, encryption, and password settings (e.g., none, personal, enterprise, wired equivalency privacy ("WEP"), Wi-Fi protected access ("WPA"), etc.). Profiles are typically displayed to a user in a profiles list on the wireless device's display screen and are typically arranged in order of network connection priority. A user may switch between WLANs by choosing a WLAN from the profiles list.

The profiles list may be populated by the wireless device upon performing a search or "scan" for available WLANs in the vicinity of the device. In this case, the profiles list will typically display available networks that broadcast their SSIDs and that are in range of the wireless device. The profiles list may also include networks for which a user has previously entered a SSID and any required profile settings. In addition, the user may create new profiles for listing in the profiles list through appropriate configuration input screens.

Thus, on a typical Wi-Fi enabled wireless device a single list of Wi-Fi profiles (i.e., for AP and security information, etc.) is maintained. A connection corresponding to the WLAN corresponding to the topmost profile in the list is typically made first, if possible. The following WLANs in the profiles list are successively attempted until a connection can be established.

One problem with maintaining a single profiles list is inflexibility. This is especially so as these single lists may grow very large. For example, as a user travels between different geographic areas, only a subset of the profiles list will pertain to access points or WLANs located in the user's current area. Having one large profiles list is difficult to manage, in terms of changing relative priorities, and can overload the user with unneeded information. In addition, a single profiles list can also delay the connection process as the entire list needs to be compared against AP scan results.

A need therefore exists for an improved method and system presenting lists of wireless local area network profile information to users of wireless and other devices. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application. Embodiments of the present application may be implemented in any computer programming language provided that the operating system of the data processing system provides the facilities that may support the requirements of the application. Any limitations presented would be a result of a particular type of operating system or computer programming language and would not be a limitation of the present application.

According to one embodiment, there is provided a method for selecting a wireless local area network ("WLAN") for a wireless device, comprising: generating a first list of WLAN identifiers for a first group of one or more wireless local area networks ("WLANs") accessible at a first geographic location and storing the first list in the wireless device; generating a second list of WLAN identifiers for a second group of one or more WLANs accessible at a second geographic location and storing the second list in the wireless device; selecting one of the first and second lists as an active list; and, scanning for WLANs identified by the active list to identify an available WLAN for the wireless device.

In accordance with further aspects of the present application there are provided apparatus such as a data processing system, wireless device, handheld computer, smart phone, mobile device, etc., methods for adapting these, as well as articles of manufacture such as a computer readable medium having program instructions recorded therein for practising the method of the application.

Figure 1:
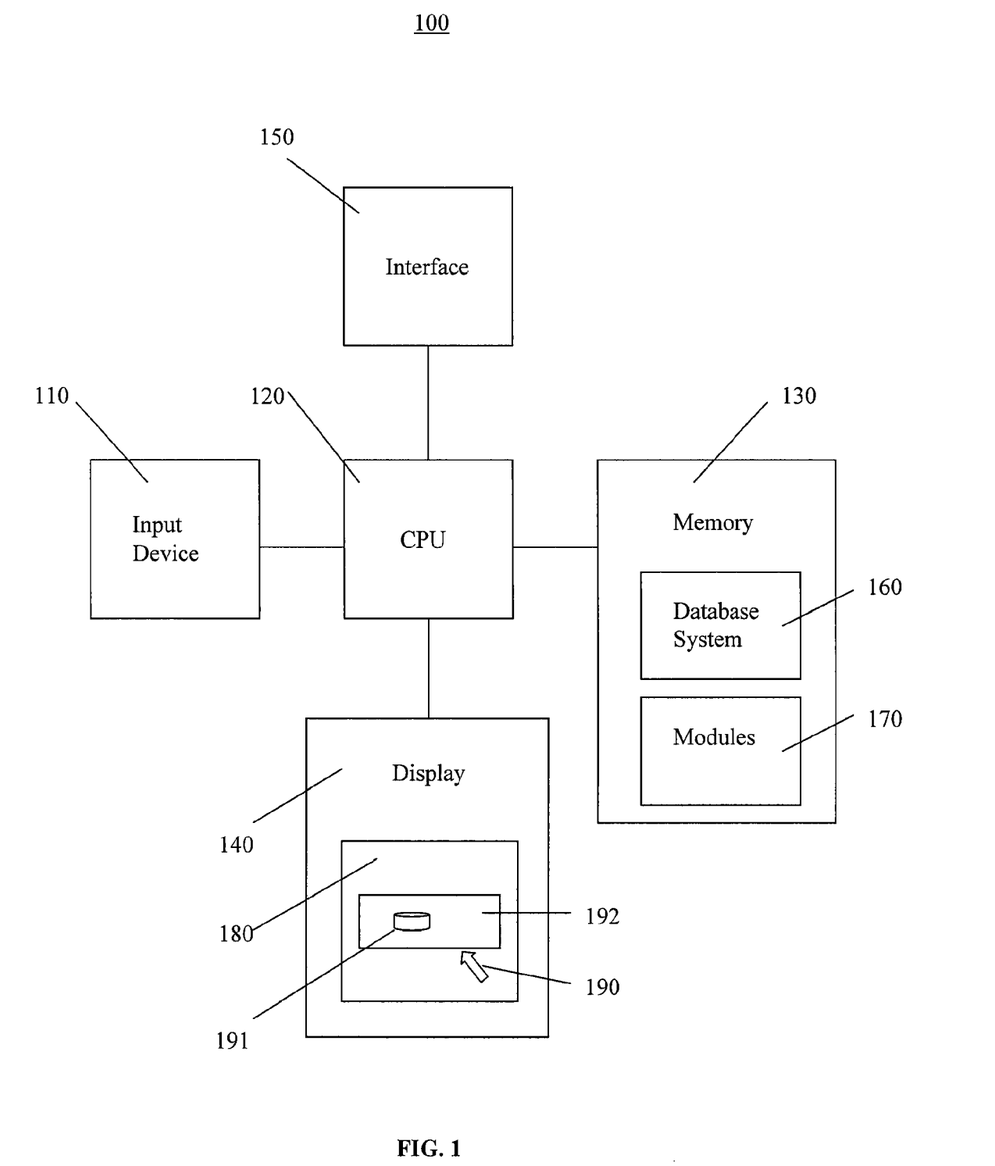
FIG. 1 is a block diagram illustrating a data processing system adapted for implementing an embodiment of the application.

FIG. 1 is a block diagram illustrating a data processing system 100 adapted for implementing an embodiment of the application. The data processing system 100 may be a server system, a personal computer ("PC") system, or a laptop computer system, for example. The data processing system 100 includes an input device 110, a central processing unit or CPU 120, memory 130, a display 140, and an interface 150. The CPU 120 may include dedicated coprocessors and memory devices. The memory 130 may include RAM, ROM, or disk devices. The memory 130 may include a variety of storage devices including internal memory and external mass storage typically arranged in a hierarchy of storage as understood to those skilled in the art. The CPU 120 of the system 100 is operatively coupled to the memory 130 which stores an operating system (not shown) for general management of the system 100. In addition, the data processing system 100 may include a database system 160 for storing and accessing programming information. The database system 160 may include a database management system ("DBMS") and a database and is stored in the memory 130 of the data processing system 100. The input device 110 may include a keyboard, mouse, trackball, remote control, or similar device. The display 140 may include a computer screen, terminal device, or a hardcopy producing output device such as a printer or plotter. The CPU 120 of the system 100 is coupled to the input device 110 for receiving user commands or queries and for displaying the results of these commands or queries to the user on a display 140. And, the interface 150 may include a network connection including an Internet connection and a wireless network 220 connection (see FIG. 2). Thus, the data processing system 100 is adapted for communicating with wired devices over a wired network and/or with wireless devices 210 over a wireless network 220. For example, the data processing system 100 may be a laptop computer equipped for both wired and wireless communications.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

The data processing system 100 includes computer executable programmed instructions for directing the system 100 to implement the embodiments of the present application. The programmed instructions may be embodied in one or more hardware or software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable signal or signal-bearing medium that is uploaded to a network by a vendor or supplier of the programmed instructions, and this signal or signal-bearing medium may be downloaded through the interface 150 to the data processing system 100 from the network by end users or potential buyers.

Figure 2:
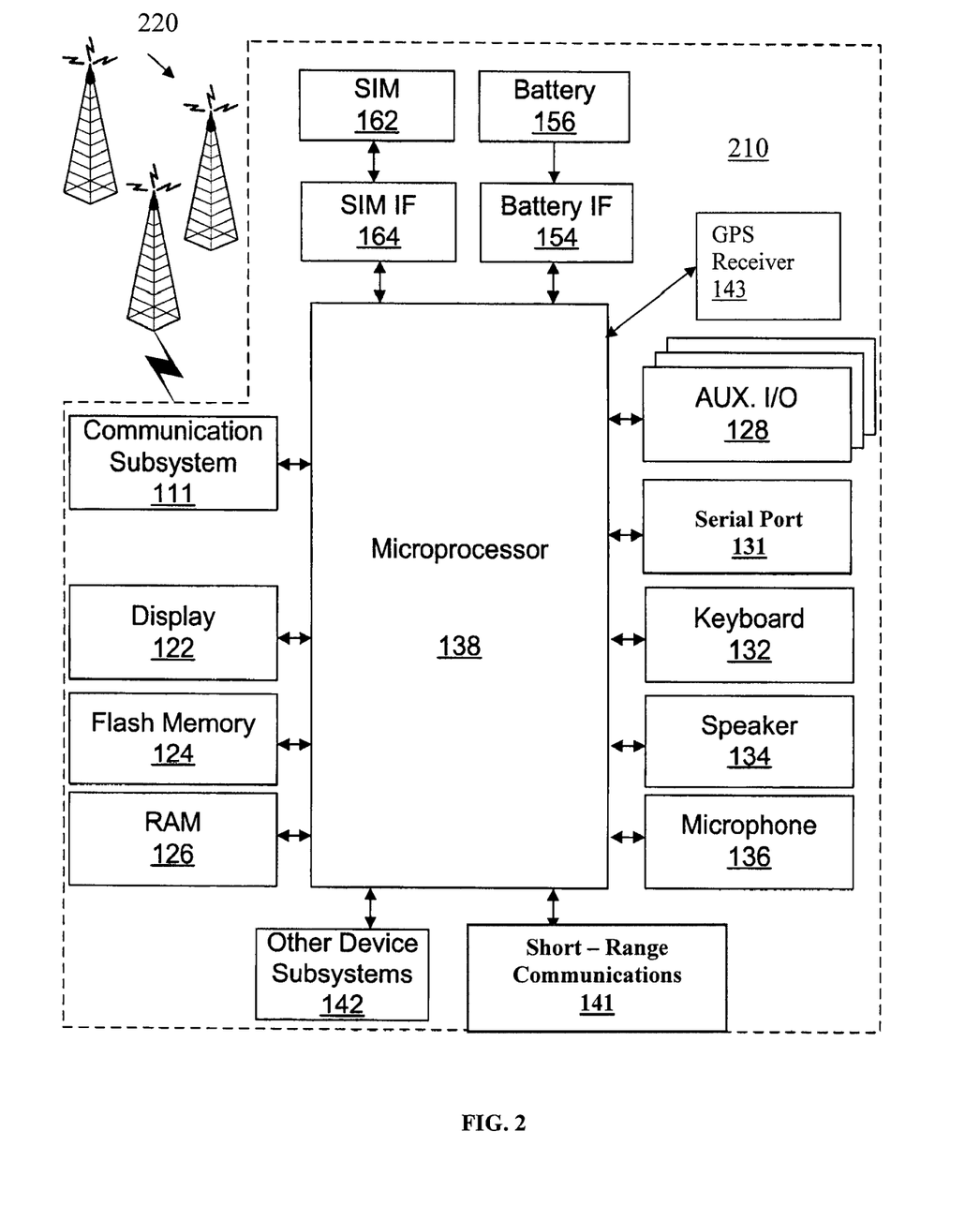
FIG. 2 is a block diagram illustrating a wireless device and a wireless communications system adapted for implementing an embodiment of the application.

FIG. 2 is a block diagram illustrating a wireless device 210 and a wireless network 220 adapted for implementing an embodiment of the application. The wireless network 220 includes antennae, base stations, and supporting radio equipment, known to those of ordinary skill in the art, for supporting wireless communications between the wireless device 210 and other devices (e.g., the data processing system 100). The wireless network 220 may be coupled through an access point (e.g., 410 in FIG. 4) to a local area network (e.g., wired LAN 430 in FIG. 4) to which the data processing system 100 may be coupled through its interface 150.

The wireless device 210 is a two-way communication device having at least voice and advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, a data communication device (with or without telephony capabilities), a Wi-Fi device, a WLAN device, or a dual-mode (i.e., Wi-Fi and cellular) device. The device 210 may communicate with any one of a plurality of fixed transceiver stations (e.g., 410 in FIG. 4) within its geographic coverage area (e.g., 401, 402 in FIG. 4).

The wireless device 210 will normally incorporate a communication subsystem 111, which includes a radio frequency ("RF") receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Cellular network access may be associated with a subscriber or user of the device 210 and therefore the device 210 typically has a Subscriber Identity Module (or "SIM" card) 162 to be inserted in a SIM interface ("IF") 164 in order to operate on the network (e.g., a global system for mobile communications ("GSM") network).

The device 210 is a battery-powered device so it also includes a battery interface ("IF") 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port (e.g., a universal serial bus ("USB") port) 131, a keyboard 132, a clickable thumbwheel (not shown), a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), electronic mail ("email"), calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

According to one embodiment, the wireless device 210 is optionally equipped with a global positioning system ("GPS") receiver 143. The GPS receiver 143 receives signals from GPS satellites and calculates the current position (e.g., longitude, latitude, altitude) of the device 210. This position is then provided to the processor 138 of the device 210 to be used for various applications.

Figure 3:
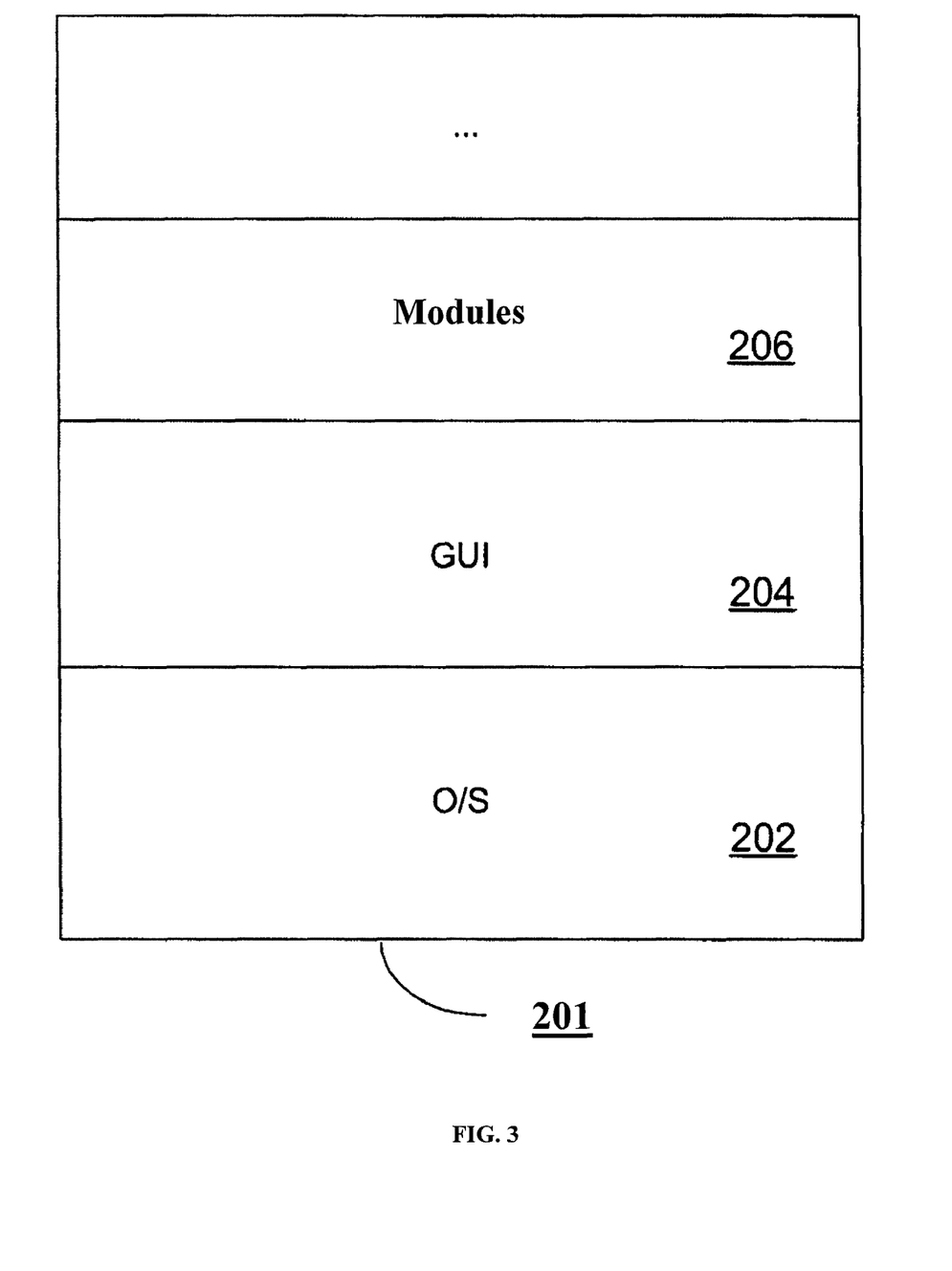
FIG. 3 is a block diagram illustrating a memory of the wireless device of FIG. 2.

FIG. 3 is a block diagram illustrating a memory 201 of the wireless device 210 of FIG. 2. The memory 201 has various software modules or components for controlling the device 210 and may include flash memory 124, RAM 126, ROM (not shown), and/or hardware modules (not shown), for example. In accordance with an embodiment of the invention, the wireless device 210 is intended to be a multi-tasking wireless communications device configured for sending and receiving data items and for making and receiving voice calls. To provide a user-friendly environment to control the operation of the device 210, an operating system ("O/S") module 202 resident on the device 210 provides a basic set of operations for supporting various applications typically operable through a graphical user interface ("GUI") module 204. The GUI module 204 may provide a GUI 180 similar to that of the data processing system 100 as described above. In particular, the O/S 202 may provide basic input/output system features to obtain input from the auxiliary I/O 128, the keyboard 132, the clickable thumbwheel, and the like, and for facilitating input/output from/to a user though a GUI 180 presented on the display screen 122. Though not shown, one or more applications for managing communications or for providing personal digital assistant like functions may also be included. In accordance with an embodiment of the application, there are provided hardware and/or software modules 206 for facilitating the presentation of WLAN profile information to users as will be described below.

Thus, the wireless device 210 includes computer executable programmed instructions for directing the device 210 to implement the embodiments of the present application. The programmed instructions may be embodied in one or more hardware or software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable signal or signal-bearing medium that is uploaded to a network by a vendor or supplier of the programmed instructions, and this signal or signal-bearing medium may be downloaded through an interface 111, 131, 141 to the wireless device 210 from the network by end users or potential buyers.

Figure 4:
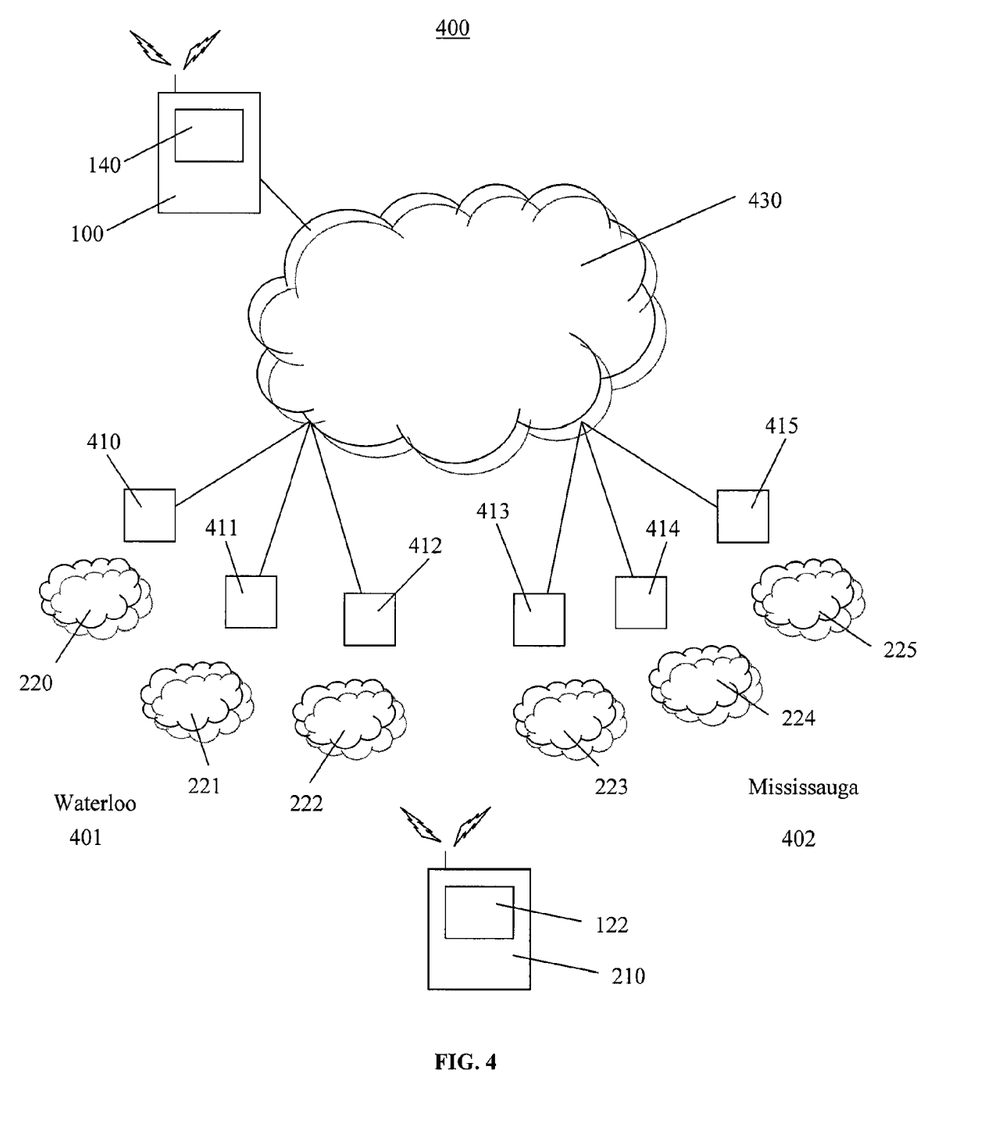
FIG. 4 is a block diagram illustrating a communications network having wireless local area networks ("WLANs") coupled to a wired local area network ("LAN") in accordance with an embodiment of the application.

FIG. 4 is a block diagram illustrating a communications network 400 having wireless local area networks ("WLANs") 220, 221, 222, 223, 224, 225 coupled to a wired local area network ("LAN") 430 in accordance with an embodiment of the application. A wireless device 210 (or 100), adapted for WLAN operation, communicates over a wireless network (e.g., 220) to a respective WLAN access point (e.g., 410). Each WLAN 220, 221, 222, 223, 224, 225 has at least one respective access point ("AP") 410, 411, 412, 413, 414, 415. Each access point ("AP") 410-415 is typically an IEEE 802.11 (i.e., Wi-Fi) radio receiver/transmitter (or transceiver) and functions as a bridge between its respective WLAN 220-225 and the wired LAN 430. For security, each AP 410-415 may be communicatively coupled to the wired LAN 430 through a respective firewall and/or VPN (not shown).

A first group of WLANs (i.e., 220, 221, 222) are located in the vicinity of a first geographic area or location 401 while a second group of WLANs (i.e., 223, 224, 225) are located in the vicinity of a second geographic area or location 402. For example, the first geographic location 401 may be Waterloo, Ontario while the second geographic location 402 may be Mississauga, Ontario. While located in the vicinity of the first geographic location 401, the wireless device 210 is able to communicate through one or more of the first group of WLANs 220-222. Similarly, while located in the vicinity of the second geographic location 402, the wireless device 210 is able to communicate through one or more of the second group of WLANs 223-225. While travelling between the first and second geographic locations 401, 402, the wireless device 210 may be able to communicate through one or more of each of the first and second groups of WLANs 220-222, 223-225, depending on available signal strength, transmitted power, etc.

As mentioned above, one problem with Wi-Fi devices that maintain a single profile list is inflexibility. This is especially so as these single lists may grow very large. For example, as a user travels between different geographic areas 401, 402, only a subset of the profile list will pertain to access points located in the current area (e.g, 401). Having one large profile list is difficult to manage, in terms of changing relative priorities, and can overload the user with unneeded information. In addition, a single profile list can also delay the connection process as the entire list needs to be compared against AP scan results.

Figure 5:
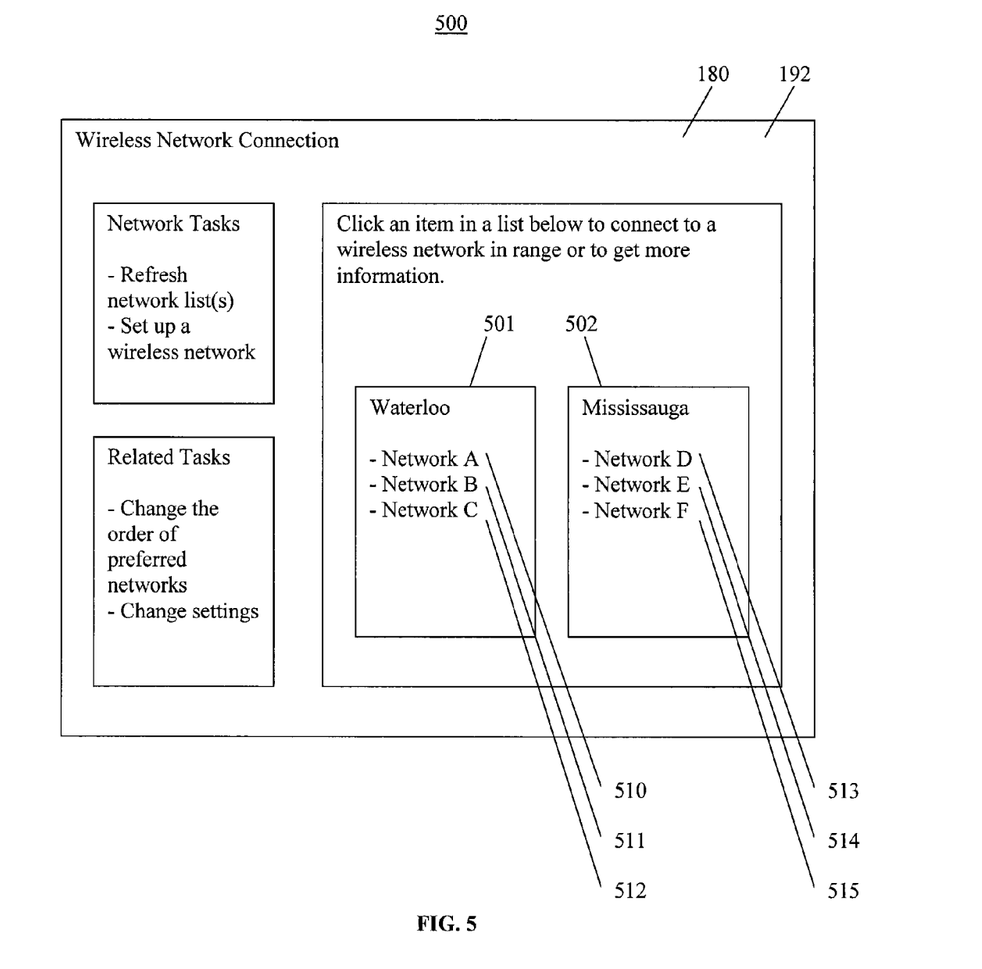
FIG. 5 is a screen capture illustrating first and second profiles lists for a wireless or other device in accordance with an embodiment of the application; and, FIG. 6 is a flow chart illustrating operations of modules within the memory of a wireless device for selecting a wireless local area network ("WLAN") for the wireless device, in accordance with an embodiment of the application.

FIG. 5 is a screen capture illustrating first and second profiles lists 501, 502 for a wireless or other device 210, 100 in accordance with an embodiment of the application. In FIG. 5, a first profiles list 501 is associated with a first geographic location or area (e.g., Waterloo) 401 and a second profiles list 502 is associated with the second geographic location or area (e.g., Mississauga) 402. Of course, it is understood that additional profiles lists (not shown) may be included for additional geographic locations or areas (not shown).

According to one embodiment, a user is provided with the ability to create a profile list 501, 502 for each geographic area 401, 402 that the user visits. Each list 501, 502 will typically only contain entries or items for APs or WLANs that are geographically located at that site 401, 402. For example, lists 501, 502 may be made for Waterloo 401 and Mississauga 402. In this case, the profiles list 501 for Waterloo 401 would include items or identifiers (e.g., SSIDs or network names) 510, 511, 512 corresponding to WLANs 220, 221, 222 in the vicinity of Waterloo 401. Similarly, the profiles list 502 for Mississauga 402 would include items or identifiers (e.g., SSIDs or Network Names) 513, 514, 515 corresponding to WLANs 223, 224, 225 in the vicinity of Mississauga 402. According to one embodiment, the items or identifiers in each profiles list 501, 502 are SSIDs or WLAN names (i.e., Network A 510, Network B 511, Network C 513, etc.). According to another embodiment, the items or identifiers 510-512, 513-515 in each profile list 501, 502 are profile names.

According to one embodiment, each item or identifier 510-512, 513-515 has an associated profile for its respective AP or WLAN which a user may access to configure or update by clicking on the item. A user may use the GUI 180 of FIG. 5 (which may be displayed in a window 192) to connect to a selected WLAN (e.g., 510, 410, 220) in a profiles list (e.g., 501), to refresh one or more of the profiles lists 501, 502 (i.e., to perform a scan for available WLANs), to set up a WLAN (e.g., 510, 410, 220), to change the order of preferred networks in each profiles list 501, 502, to change settings for a selected WLAN (e.g., 510, 410, 220), and to choose an active profiles list (see below).

According to one embodiment, the first and second lists 501, 502 may relate to APs or WLANs in the vicinity of the user's work 401 and home 402.

According to one embodiment, only one profiles list (e.g., 501) is an "active profiles list" at any given time. The device 210 will automatically associate with APs or WLANs (e.g., 220-222) listed (e.g., 510-512) in the current active profiles list (e.g., 501) only, and ignore all other profiles lists (e.g., 502) during its scan for available wireless networks. Thus, the use of multiple profiles lists 501, 502 provides improved flexibility and efficiency over the use of a single (master) profiles list.

According to one embodiment, the user may switch between active profiles lists (e.g., from 501 to 502) manually as the user moves between locations (e.g., from 401 to 402).

According to another embodiment, the switch between active profiles lists may be performed automatically. Automatic switching may be facilitated by the wireless device's global positioning system ("GPS") receiver 143 (if so equipped). In this embodiment, when a new profile (e.g., having related item or identifier 510) is added to a list (e.g., 501), the current position (e.g., the longitude and latitude of location 401) of the wireless device 210 is recorded for the profile. When the user physically moves with the wireless device 210 to a location (e.g., 402) that is a preset range (e.g., 10 km) away from all APs 410-412 or WLANs 220-222 having profiles 510-512 listed in the current list 501 (or away from the "average" triangulated distance of all profiles 510-512 in the list 501), then the user has likely left the geographic area 401 that the list 501 corresponds to. The device 210 then checks the position of the APs (e.g., 413-415) or WLANs (e.g., 223-225) having profiles (e.g., 513-515) listed in other defined profiles lists (e.g., 502) and automatically activates the list (e.g., 502) that corresponds to a location that is closer to the current location 402 of the wireless device 210 than the previous location 401. Thus, if the user boards a plane in a first city (e.g., Waterloo 401) and steps off the plane in a second city (e.g., Mississauga 402), then the profiles list 502 defined for that second city 402 immediately becomes the current active profiles list.

According to another embodiment, the switch between active profiles lists may be performed automatically by an alternate method. According to this method, active list selection is automated by performing a scan for available networks at the current location (e.g., 401) and if the SSIDs found do not match any SSIDs (e.g., 510-512) on the current active profiles list (e.g., 501), then an attempt is made to match the SSIDs found against the SSIDs (e.g., 513-515) on another profiles list (e.g., 502). If a match is found in another profiles list 502, then the device 210 can select the other profiles list 502 making it the active profiles list.

A user may also specify multiple profiles lists for a single geographic area. For example, both a user's "work" and "home" lists may be with respect to APs or WLANs located in the same city (e.g., Waterloo 401). To accommodate this situation, according to one embodiment, a hierarchical arrangement of profile lists is supported in which a profiles list for a geographic area (e.g., profiles list 501 for Waterloo 401) can contain lists (or sub-lists) for home and work profiles. In FIG. 5 for example, "Network B" 511 may belong to a home profiles list while "Network C" 512 may belong to a work profiles list. The home profiles list 511 and the work profiles list 512 are sub-lists, or are included in, the profiles list 501 for Waterloo 401. By activating the Waterloo profiles list 501, all sub-lists (i.e., home profiles list 511 and work profiles list 512) are activated too, so that the device 210 can scan both the home and work profiles lists. Of course, while not shown in FIG. 5, divisions of the Waterloo profiles list 501 into a home profiles list 511 and a work profiles list 512 may be shown graphically by the GUI 180. In particular, when a root node or list (e.g., 501 for "Waterloo") is marked active, then all of its sub-nodes or lists (e.g., "Home" 511 and "Work" 512) in the hierarchical tree or list may also be considered as being active and eligible for connection. Nodes (e.g., 511, 512) on the same level may be prioritized in terms of the order in which they are considered (e.g., "Work" 511 first, then "Home" 512 if no matches found). Likewise, the profiles within these nodes 511, 512 may also be prioritized.

In addition, according to one embodiment, a user can define a "public hotspot" profiles list, item, or identifier (e.g., "Network A" 510) at the Waterloo profiles list 501 level (accessible anywhere within the city 401) that will be connected to first. If connection to the public hotspot 510 AP or WLAN is not possible, then the entries under work and home profiles lists 511, 512 will be attempted. Though this hierarchy, the number of hotspots that are scanned against at any one time can be reduced thereby improving efficiency.

According to one embodiment, the same WLAN profile may be associated with more than one list (e.g., Network A 510 may appear in both profiles lists 501 and 502, if appropriate).

According to another embodiment, each profiles list 501, 502 contains only WLAN (i.e., Wi-Fi) profiles (any number of them). That is, wired LAN profiles are not included in the profiles lists 501, 502.

With respect to setting up a WLAN profile for a wireless or other device 210, 100, currently users are required to manually set up a WLAN profile for each new WLAN network that they encounter (e.g., by scanning for available networks) and wish to connect to. According to one embodiment, a method is provided for sharing WLAN profiles amongst devices 210, 100 and for choosing WLAN settings or parameters (e.g., SSID or WLAN name, profile name, operating mode, standard type, security option, encryption option, password, etc.) to reuse under certain conditions.

Noting that profiles are typically created but are not destroyed and that many profiles are "temporary" in nature (i.e., they are used infrequently), instead of expiring or deleting temporary profiles yet still reducing the number of number of static profiles, according to one embodiment, infrequently used profiles are hidden from the user. That is, rather than being presented in a profiles list 501, 502, infrequently used profiles are stored in memory. However, when the wireless or other device 210, 100 recognizes that it is in the vicinity of a WLAN associated with an infrequently used profile, the device 210, 100 will recall the infrequently used profile from memory and will automatically attempt reconnection using the previously specified parameters. In this embodiment, criteria used to determine proximity to a WLAN may include: detection of the SSID of the infrequently used profile, proximity of a wireless cellular system (e.g., global system for mobile communications ("GSM"), enhanced data GSM environment ("EDGE"), general packet radio service ("GPRS"), etc.) antennae site or tower close to a known infrequently used profile location, and GPS information.

In addition, infrequently used profiles from a device 210, 100 may be collected by infrastructure equipment (e.g., servers, data processing systems 100, etc.) associated with the WLAN, the wired LAN 430, or a cellular network and may be shared with other devices that may enter the vicinity of the WLAN as detected by the criteria described above.

According to one embodiment, the wireless device 210 may be a dual-mode device having both WLAN (i.e., Wi-Fi) and cellular functionality. In this embodiment, the wireless device 210 is also able to communicate over a cellular network (not shown), such as a GSM network, linked to the wired LAN 430.

Embodiments of the application provide several advantages. First, for example, by automating profile selection as described above, only pertinent information is presented to users when they view or edit their profiles list. This helps users reduce the often cumbersome task of prioritizing entries on large lists of profiles. Second, note that the same SSID, being plain text, may be defined in two different geographic areas 401, 402 and as such a user will need to know which is the right SSID to select in order to gain WLAN access. The problem of determining which SSID to select is addressed by the separate profiles lists 501, 502 of the present application. In particular, the same SSID is often used for different networks (e.g., Linksys™ routers have a default SSID called "linksys"). Storing the same SSID in different groups allows the user to reference different APs even if they have the same SSID, thus avoiding trying to connect to an AP with the wrong credentials (i.e., media access control ("MAC") addresses are generally not used as part of AP identification, just the SSID).

Figure 6:
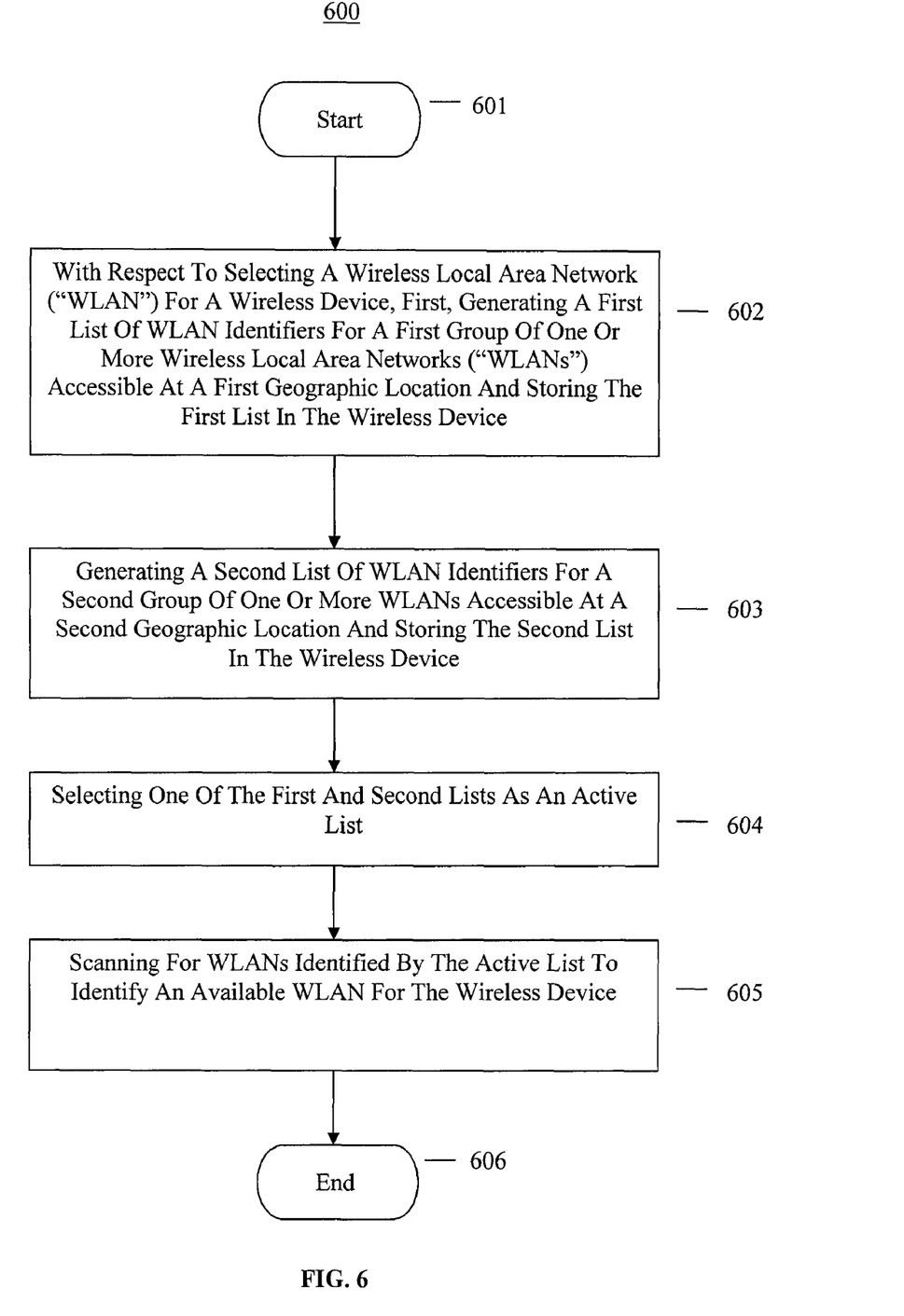

Aspects of the above described method may be summarized with the aid of a flowchart. FIG. 6 is a flow chart illustrating operations 600 of modules 206 within the memory 201 of a wireless device 210 for selecting a wireless local area network ("WLAN") for the wireless device 210, in accordance with an embodiment of the application.

At step 601, the operations 600 start.

At step 602, a first list 501 of WLAN identifiers 510-512 for a first group of one or more wireless local area networks ("WLANs") 220-221 accessible at a first geographic location 401 is generated and the first list 501 is stored in the wireless device 210.

At step 603, a second list 502 of WLAN identifiers 513-515 for a second group of one or more WLANs 223-225 accessible at a second geographic location 402 is generated and the second list 502 is stored in the wireless device 210.

At step 604, one of the first and second lists 501, 502 is selected as an active list (e.g., 501).

At step 605, WLANs 220-221 identified by the active list 501 are scanned for to identify an available WLAN (e.g., 220) for the wireless device 210.

At step 606, the operations 600 end.

In the above method, each WLAN identifier 510-515 may have an associated WLAN profile including a geographic location of the respective WLAN 220-225. Each WLAN identifier 510-515 may be one of a service set identifier ("SSID"), a network name, and a profile name. Each of the first and second groups 220-222, 223-225 of WLANs may be accessible from at least one (e.g., 401) of the first and second geographic locations 401, 402. The method may further include combining the first and second lists 501, 502 in a hierarchical list. The hierarchical list may be selectable as the active list. An order of the first and second lists 501, 502 in the hierarchical list may be selectable. The step of selecting 604 may further include: presenting the first and second lists to a user on a display screen 122 of the wireless device 210; and, receiving a signal from the user indicating a choice of one of the first and second lists 501, 502 as the active list. The WLAN identifiers of infrequently used WLANs may be excluded from the first and second lists 501, 502 when the wireless device 210 is remote from the first and second geographic locations 401, 402, respectively. The step of selecting 604 may further include: receiving a signal indicative of a current location (e.g., 401) of the wireless device 210; and, determining which of the first and second geographic locations 401, 402 is closest to the current location 401. The signal may be received from a global positioning system ("GPS") receiver 143 included in the wireless device 210. And, the signal may be received from a cellular telephone system.

The above described method is generally performed by the wireless device 210. However, according to an alternate embodiment, the method can be performed by any data processing system (e.g., 100) adapted to operate on a wireless network (e.g., 220).

While embodiments of this application are primarily discussed as a method, a person of ordinary skill in the art will understand that the apparatus discussed above with reference to a wireless device 210 and a data processing system 100, may be programmed to enable the practice of the method of these embodiments. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of these embodiments. It is understood that such apparatus and articles of manufacture also come within the scope of the application.

The embodiments of the application described above are intended to be exemplary only. Those skilled in this art will understand that various modifications of detail may be made to these embodiments, all of which come within the scope of the application.

What is claimed is:

1. A method for selecting a wireless local area network ("WLAN") for a wireless device, comprising:
generating a first list of WLAN identifiers for a first group of one or more wireless local area networks ("WLANs") accessible at a first geographic location and storing the first list in the wireless device;
generating a second list of WLAN identifiers for a second group of one or more WLANs accessible at a second geographic location and storing the second list in the wireless device;
presenting the first and second lists on a display screen of the wireless device;
selecting one of the first and second lists as an active list; and,
scanning for WLANs identified by the active list to identify an available WLAN for the wireless device;
wherein WLAN identifiers of infrequently used WLANs are excluded from the presented first and second lists when the wireless device is remote from the first and second geographic locations, respectively.

2. The method of claim 1 wherein each WLAN identifier has an associated WLAN profile including a geographic location of the respective WLAN.

3. The method of claim 2 wherein each WLAN identifier is one of a service set identifier ("SSID"), a network name, and a profile name.

4. The method of claim 2 wherein each of the first and second groups of WLANs are accessible from at least one of the first and second geographic locations.

5. The method of claim 4 and further comprising combining the first and second lists in a hierarchical list.

6. The method of claim 5 wherein the hierarchical list is selectable as the active list.

7. The method of claim 5 wherein an order of the first and second lists in the hierarchical list is selectable.

8. The method of claim 2 wherein the selecting further comprises receiving a signal indicating a choice of one of the first and second lists as the active list.

9. The method of claim 2 wherein the selecting further comprises: receiving a signal indicative of a current location of the wireless device; and, determining which of the first and second geographic locations is closest to the current location.

10. The method of claim 9 wherein the signal is received from a global positioning system ("GPS") receiver included in the wireless device.

11. The method of claim 9 wherein the signal is received from a cellular telephone system.

12. A system for selecting a wireless local area network ("WLAN"), the system comprising:
a processor coupled to an interface to one or more wireless local area networks ("WLANs"); and,
modules executed by the processor, the modules including:
a module for generating a first list of WLAN identifiers for a first group of one or more WLANs accessible at a first geographic location and storing the first list in the system;
a module for generating a second list of WLAN identifiers for a second group of one or more WLANs accessible at a second geographic location and storing the second list in the system;
a module for presenting the first and second lists on a display screen of the system;
a module for selecting one of the first and second lists as an active list; and,
a module for scanning for WLANs identified by the active list to identify an available WLAN for the system;
wherein WLAN identifiers of infrequently used WLANs are excluded from the presented first and second lists when the system is remote from the first and second geographic locations, respectively.

13. The system of claim 12 wherein each WLAN identifier has an associated WLAN profile including a geographic location of the respective WLAN.

14. The system of claim 13 wherein each WLAN identifier is one of a service set identifier ("SSID"), a network name, and a profile name.

15. The system of claim 13 wherein each of the first and second groups of WLANs are accessible from at least one of the first and second geographic locations.

16. The system of claim 15 and further comprising a module for combining the first and second lists in a hierarchical list.

17. The system of claim 16 wherein the hierarchical list is selectable as the active list.

18. The system of claim 16 wherein an order of the first and second lists in the hierarchical list is selectable.

19. The system of claim 12 wherein the module for selecting further comprises a module for receiving a signal indicating a choice of one of the first and second lists as the active list.

20. The system of claim 13 wherein the module for selecting further comprises: a module for receiving a signal indicative of a current location of the system; and, a module for determining which of the first and second geographic locations is closest to the current location.

21. The system of claim 20 wherein the signal is received from a global positioning system ("GPS") receiver included in the system.

22. The system of claim 20 wherein the signal is received from a cellular telephone system.

* * * * *